United States Patent [19]
Wagner

[11] 4,180,625
[45] Dec. 25, 1979

[54] SEMICONDUCTOR LIQUID JUNCTION PHOTOCELL USING A CUINS$_2$ ELECTRODE

[75] Inventor: Sigurd Wagner, Evergreen, Colo.

[73] Assignee: Bell Telephone Laboratories, Incorporated, Murray Hill, N.J.

[21] Appl. No.: 935,661

[22] Filed: Aug. 21, 1978

[51] Int. Cl.$^2$ .................... H01M 6/30; H01M 6/36
[52] U.S. Cl. .................... 429/111; 250/211 J; 250/212
[58] Field of Search ............... 429/111; 250/211 R, 250/211 J, 212; 357/30

[56] References Cited
U.S. PATENT DOCUMENTS 4,011,149  3/1977  Nozik ................. 204/129

OTHER PUBLICATIONS

M. Robbins et al "CuInS$_2$ Liquid Junction Solar Cells," J. Electrochem Soc., vol. 125, May 1978, pp. 831–832.
H. Gerischer, "Electrochemical Photo & Solar Cells--Principles & Some Experiments" *Electroanalytical/Interfacial Electrochemistry*, vol. 58, pp. 263–274 (1975).
K. C. Chang et al "Stable Semiconductor Liquid Junction Cell With 9% Solar-To-Electrical Conversion Efficiency" *Science* vol. 196, pp. 1097 (1977).

*Primary Examiner*—Aaron Weisstuch
*Attorney, Agent, or Firm*—Richard D. Laumann

[57] ABSTRACT

Liquid-semiconductor photocells have received much attention recently as candidates for use in solar power conversion devices. A semiconductor liquid junction photovoltaic cell having a photoactive electrode made from CuInS$_2$ and a liquid electrolyte containing a redox couple consisting of S$_2$=/S= anions has been found to produce a stable photocurrent output.

5 Claims, 1 Drawing Figure

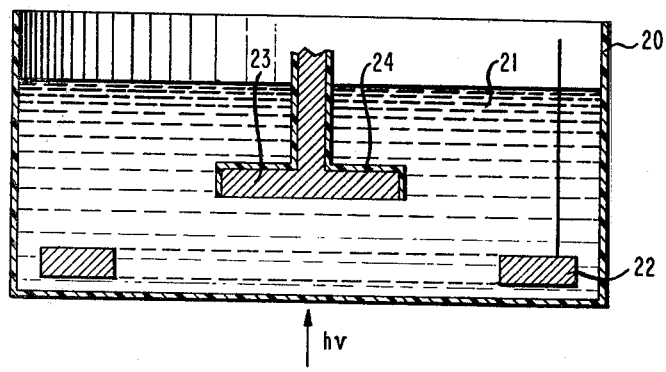

SEMICONDUCTOR LIQUID JUNCTION PHOTOCELL USING A CUINS₂ ELECTRODE

BACKGROUND OF THE INVENTION

1. Field of the Invention

This invention relates generally to semiconductor liquid junction photocells, and in particular, to such photocells using $CuInS_2$ as the photosensitive electrode.

2. Description of the Prior Art

Concern over the possible depletion of fossil fuel energy resources has generated intense interest in recent years in the search for and development of alternative energy sources. One contemplated alternative energy source is solar energy which may be utilized as electricity either directly through photovoltaic devices or indirectly through thermal devices. The latter approach has not received as much attention as the former which will, as presently contemplated, use semiconductor devices. These semiconductor devices are presently relatively expensive power sources, as compared to fossil fuel power sources, because the devices generally collect light in proportion to the areas of their photosensitive junctions, which must be large to generate useful photocurrents. The manufacturing cost of such devices depends mainly upon the area of the photosensitive junction and is presently too high to permit successful commercial exploitation in other than specialized applications.

Considerable effort has therefore been expended in attempting to reduce the cost of converting solar energy to electricity with semiconductor devices. One approach is to use polycrystalline thin films rather than single crystals as the photoactive elements. Another approach that has generated much interest and enthusiasm recently is a liquid-semiconductor solar cell in which the active part of the cell is a junction formed at a liquid-semiconductor interface. Properties of this type of solar cell were reviewed by Gerischer in *Electroanalytical Chemistry and Interfacial Electrochemistry* 50, pages 263-274, (1975). Because the junction forms spontaneously at the semiconductor-liquid interface and relatively costly epitaxy or diffusion procedures are not required to form the junction, semiconductor liquid junction solar cells promise economies in manufacture as compared to cells in which the junction is formed between two solids.

Many semiconductors have been investigated as photoactive electrode materials in semiconductor liquid junction cells. Cell stability has been a recurrent problem and the efficiency of the photocell may decline with operating time for any of several reasons. For example, photoexcitation may produce holes at the surface which chemically react with the electrolyte and produce an elemental layer of one of the semiconductor constituents on the electrode surface. Other processes, such as chemical etching or deposition of electrolyte impurities on the semiconductor surface, may also occur. These processes corrode and/or passivate the semiconductor surface and degrade cell efficiency as manifested by a decrease in photocurrent as cell operating time increases. One approach to this problem involves the use of a polychalcogenide/chalcogenide redox couple which consumes the holes in competition with the corrosion reaction. Although it is difficult if not impossible, to accurately predict all degradation mechanisms for a particular semiconductor and take precautions to avoid the mechanisms, such an approach has been successful with CdSe, CdS and GaAs electrodes.

A bandgap between approximately 1.0 and 1.7 ev will theoretically give the most efficient photovoltaic conversion of solar power into electricity and a cell using such a material and producing a stable photocurrent over an extended time period would be extremely desirable from a commercial point of view. Although some semiconductors, such as GaAs, with bandgaps within the desired range have produced stable photocurrent output for extended time periods, a search for other semiconductors capable of producing stable photocurrents for extended time periods continues because of possible economic advantages they may offer.

SUMMARY OF THE INVENTION $CuInS_2$ is used as the photoactive semiconductor electrode in a liquid-semiconductor junction photocell having a liquid electrolyte containing a redox couple consisting of sulfide/polysulfide anions having a concentration greater than 0.1 molar. A $CuInS_2$ photocell made in accordance with this invention has an efficiency of approximately 4 percent solar to electrical power conversion and a reasonably constant photocurrent for an extended time period.

BRIEF DESCRIPTION OF THE DRAWING

The FIGURE is a schematic representation of a liquid semiconductor photocell.

DETAILED DESCRIPTION

The cell structure of the FIGURE comprises a container 20, electrolyte 21, counter electrode 22, which is carbon or platinum, although other inert materials may be used, and active electrode 23. The electrolyte is usually aqueous although nonaqueous electrolytes can be used. Electrode 23 is insulated with epoxy 24 except where illuminated. The container may be made of any conveniently available glass or plastic material. The bottom of the cell, opposing electrode 23, is transparent to pass incident light as shown.

The photoactive electrode formed from $CuInS_2$ may be either single crystal, grown by any conventional technique such as gradient freeze or zone melting, or polycrystalline. Polycrystalline electrodes may be formed by any of several techniques. Polycrystalline $CuInS_2$ may be prepared by casting high purity liquid semiconductor material in well known manner. Another useful technique is described in the *Journal of the Electrochemical Society*, pp. 1019-1021, July 1977. This technique sinters and vapor anneals semiconductor powder of high purity to produce grains of sufficient size to absorb practically all incident light in the top layer of grains exposed to the electrolyte.

The electrode may be doped with any conventional technique. A preferred dopant is Cd although other materials, such as In, that give n-type behavior can be used. The net electron density is desirably between $10^{16}/cm^3$ and $5 \times 10^{18}/cm^3$. The lower limit results in depletion layer widths comparable to the absorption length for solar light and in a high solar energy to electricity conversion efficiency. Higher concentrations reduce the electrode series resistance and facilitate the preparation of ohmic contacts. The maximum dopant concentration for light absorption within the surface depletion region is $10^{16}/cm^3$. Electrical contacts, such as indium and silver epoxy, are then made to the electrodes with conventional techniques.

The electrode, whether single crystal or polycrystalline, should be etched to remove surface defects whose presence would reduce cell efficiency. Suitable etchants include a 3:1 to 4:1 mixture of HCl and $HNO_3$ which is used for approximately 30 seconds and a solution of 1 volume percent of bromine in methanol which is used at room temperature for approximately ten seconds. Both etchants are followed by a water rinse.

Under illumination in a suitable electrolyte, holes come to the surface of the n-type semiconductor material and cause its oxidative dissolution. This photoetching reaction can be suppressed if a competing reaction can be found that will scavenge for holes and compete directly with the photoetching reaction. A redox couple consisting of sulfide/polysulfide anions has been found to suppress photoetching in cells using $CuInS_2$ electrodes sufficiently to permit cells with stable photocurrents for extended time periods to be made. For example, the reaction is $2S^{--}+2h^+ \rightarrow S_2^{--}$ at the photoactive electrode and the reaction at the inert electrode is $S_2^{--}+2 \rightarrow 2S^{--}$. Consequently, there is no net chemical change in the cell.

Suitable redox electrolyte concentrations range from a maximum represented by a saturated solution to a minimum of approximately 0.1 molar which represents the minimum concentration in an aqueous solution required to consume sufficient holes, when the cell is illuminated by sunlight, e.g., air mass two, to prevent unduly rapid photoetching. Higher intensities will require higher concentrations. The redox couple is formed by any conventional and well known technique that puts the desired anions into solutions. Other than aqueous electrolytes may be used but since they generally have a lesser electrical conductivity, internal losses are greater. For high concentrations, light absorption in the electrolyte can be partially compensated by making the liquid layer thin.

Example: A platelet, forming the photoactive electrode, was cut from an n-type $CuInS_2$ crystal that was prepared by casting. A Ga-In contact was made to one face and was connected to a copper lead wire. The platelet edges, the back or contacted face, and the portion of the copper lead wire near the platelet were coated with epoxy resin to obtain electrical insulation. After the resin had set, the electrode was etched for ten seconds in a solution of 1 volume percent bromine. The $CuInS_2$ electrode with an exposed area of 0.07 $cm^2$ was put into a glass container, forming the cell, which was filled with a sulfide/polysulfide redox couple formed by dissolving 78 grams of $Na_2S.9H_2O$; 40 grams NaOH, and 32 grams of S in 1000 ml of $H_2O$. A platinized platinum sheet with a surface area of approximately 10 $cm^2$ formed the counter electrode. Connections were made to a digital voltammeter.

Upon illumination with a lamp having an approximately 2800 degree K spectrum and giving an intensity at the exposed electrode surface of approximately 50 $mw/cm^2$, the open-circuit voltage was 0.514 volts and the short-circuit current was 0.117 mA.

I claim:

1. A photocell containing a photovoltaic junction between a semiconductor and a liquid electrolyte, said electrolyte containing a redox couple consisting of sulfide and polysulfide anions having a concentration of at least 0.1 molar;
   characterized in that
   said semiconductor consists essentially of n-type $CuInS_2$.

2. A photocell as recited in claim 1 in which said electrolyte is an aqueous electrolyte.

3. A photocell as recited in claim 2 in which said redox couple has a nominal one molar concentration.

4. A photocell as recited in claim 1 or 3 in which said $CuInS_2$ is doped with Cd.

5. A photocell as recited in claim 4 in which said Cd has a concentration less than $5 \times 10^{18}/cm^3$.

* * * * *